United States Patent [19]

Stenzel et al.

[11] Patent Number: 4,550,314
[45] Date of Patent: Oct. 29, 1985

[54] METER MONITOR APPARATUS

[75] Inventors: Wallace I. Stenzel, Thiensville; Kenneth R. Payne, Menomonee Falls, both of Wis.

[73] Assignee: Waukee Engineering Company, Milwaukee, Wis.

[21] Appl. No.: 415,584

[22] Filed: Sep. 7, 1982

[51] Int. Cl.⁴ .............................................. G08B 21/00
[52] U.S. Cl. .................................. 340/623; 73/861.56; 250/231 R; 340/606
[58] Field of Search ............... 340/623, 606, 628, 618, 340/619, 630, 608, 609; 357/75; 356/410, 411, 436, 437, 438, 439, 73; 250/575, 231 R; 307/117; 73/861.41, 861.56, 861.57

[56] References Cited

U.S. PATENT DOCUMENTS

| | | | |
|---|---|---|---|
| 3,150,360 | 9/1964 | Stenzel | 340/606 X |
| 3,358,148 | 12/1967 | Conklin et al. | 250/575 |
| 3,563,090 | 2/1971 | Deltour | 73/861.41 |
| 3,774,086 | 11/1973 | Vincent, Jr. | 357/75 X |
| 4,105,028 | 8/1978 | Sadlier et al. | 73/861.41 X |

FOREIGN PATENT DOCUMENTS 44-16463  6/1969  Japan ................................... 340/628

Primary Examiner—James L. Rowland
Assistant Examiner—Daniel Myer
Attorney, Agent, or Firm—Andrus, Sceales, Starke & Sawall

[57] ABSTRACT

A gas flowmeter includes an oil-filled tube coupled to the gas flow line and a float lifted by gas flow. An LED lamp transmitter and a photoresistor receiver are coupled to a guard telescoped over the tube. The LED lamp has an integrated concentrating lens to define a concentrated sharp beam passing through a small barrel located in a guard slot for close coupling the light beam to the tube. The photoresistor receiver includes a similar barrel in an opposite slot in accurate alignment with the transmitter barrel. The receiver includes a photoresistor connected in a dividing network to define an input node to a regenerative "Schmitt" switch which actuates a solid state control relay to indicate a limit position of the float. A mounting plate has a correspondingly mounted light transmitter housing and photoresistor housing. The housings are formed from the same casting. The housings include similar integral clamping tongues located in slots on the opposite sides of the guard. A clamping screw on the plate positively clamps the plate and thereby the transmitter and receiver in an adjusted position on the tube.

7 Claims, 8 Drawing Figures

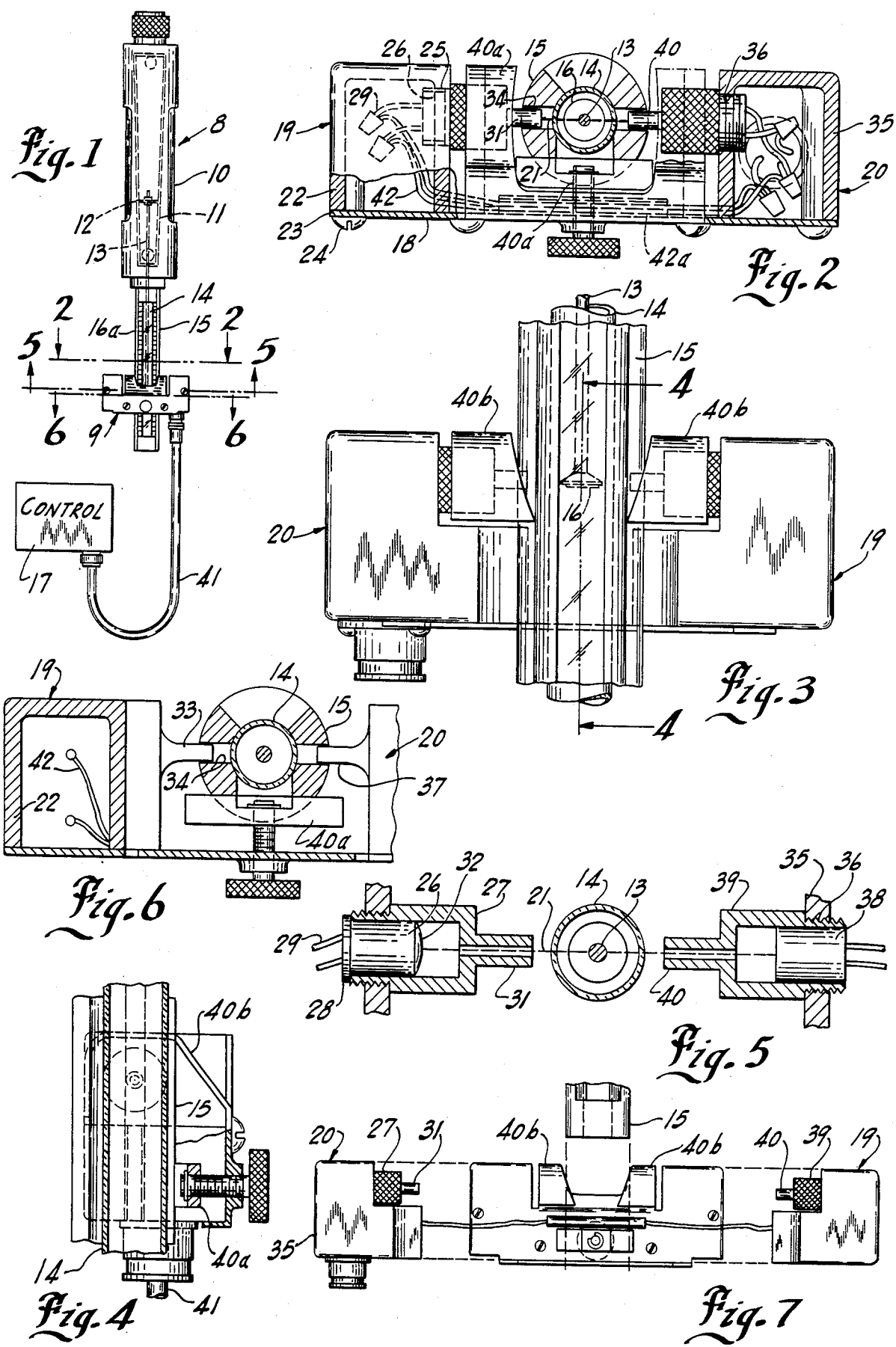

METER MONITOR APPARATUS

BACKGROUND OF THE PRESENT INVENTION

This invention relates to an improvement in a meter monitor apparatus for monitoring the position of a mechanical indicator or pointer and in particular to such a device for monitoring the pressure and/or flow of a fluid between a high value, a low value or both and producing an output indicative of the pressure and/or flow condition.

Gas flowmeters, as well as other fluid flowmeters, are available to monitor the rate of flow. For example, continuous supervision has been provided by alarm devices to detect too low of flow of hydrogen, disassociated ammonia as well as natural carrier and other gases to furnaces. Similary, excessive flow in use of costly gases, such as argon and helium, may be detected. A particularly satisfactorily gas flowmeter and alarm or monitor unit is disclosed in U.S. Pat. No. 3,150,360 which issued Sept. 22, 1964 to Wallace L. Stenzel and is assigned to the present assignee herewith. As more fully disclosed therein, a photoelectric monitor or alarm unit includes an incandescent lamp unit and a photosensitive unit such as a photocell mounted to the opposite sides of a transparent tube coupled to the flow line. The tube is filled with a liquid and a pointer is mounted within the tube and coupled to the flow system for positioning in the liquid in accordance with the flow rate. A tube guard is telescoped over the tube and the alarm unit is clamped thereto with the lamp unit and the photocell aligned with oppositely located slots for transmission of the light beam. The pointer includes at least one opaque section operable to move through the light beam as the flow rate varies through a particular level. The lamp unit includes a special separate lens unit secured between the lamp and the tube guard slot for focusing the light beam onto the tube. The photocell includes an aperature aligned with the light beam for concentrating the beam onto a light sensitive area of the photocell unit. The lamp and the photocell units include outer housings which are mounted on a clamping support. A clamping bolt is threaded in the support with a clamping bracket on its inner end which moves into engagement with the guard to clamp the alarm device in position. The alarm device is located on the guard to respond to a particular flow rate indication. Although shown therein using a vacuum tube circuit, a light sensitive controlled rectifier has been used to control a solid state relay.

Although the prior art photoelectric systems have provided a reliable monitoring means, the systems are subject to malfunction, such as in the event the float oil becomes contaminated. Further, the systems tend to produce an unstable response and output in the presence of slow changes in the flow rate at the control limit. Thus, a chattering type response is at times encountered under such conditions of slow changes in the fluid state. Certain applications are of course more critical than others. For example, sintering furnaces using hydrogen gas atmosphere must be fully monitored for loss of hydrogen gas, because any such loss may allow entry of air, creating a possible explosive condition. Other applications which use rare and costly gases are monitored for most efficient usage because of the cost factors. In other systems, a similar requirement of pressure detection may be required. A float system may of course provide accurate detection of pressure, but a suitable transducer must again be provided.

There is therefore a need for a sensitive control for reliable detection of change in gas flow conditions through a selected limit.

SUMMARY OF THE PRESENT INVENTION

The present invention is particularly directed to a fluid flowmeter having an output level limit monitoring means adapted to detect movement of a mechanical pointer means in a transparent tube support and in particular to an improved adjustably mounted photoelectric detecting system responsive to the movement of the indicator pointer means within a float tube. Generally, in accordance with the present invention, a light beam unit includes an LED-type lamp mounted within a barrel transmitter unit and a photosensitive unit such as a photoresistor mounted in a barrel receiver alinged with the transmitter. The photoresister is connected to a high speed solid state regenerative switch circuit which is extremely sensitive to the output of the photoresistor and once switching is initiating is positively driven to the alternate state. The LED provides a small highly concentrated beam which can effectively penetrate a relatively contaminated liquid while the regenerative switch circuit responds to small changes in the state of the photoresistor so as to avoid an unstable output state and thereby produces a highly reliable and effective control. More particularly, in a preferred and optimum construction of the present invention, the transmitter and receiver are coupled to a guard tube telescoped over the indicator tube. The LED lamp has an integrated concentrating lens to define a concentrated sharp beam passing through a small barrel opening. The transmitter barrel is located in the guard slot with the end surface at least closely adjacent the transparent tube to close couple the light beam to the transparent tube. The photoresistor is mounted in a corresponding barrel located in the opposite slot of the guard, with the light receiver barrel opening located to the opposite side of the tube in accurate alignment with the transmitter barrel. The photoresistor is connected in a dividing network to define an input node to a regenerative solid state switch, such as a "Schmitt" circuit. The output of the "Schmitt" switch actuates a solid state relay or other output means for producing a power output indicative of the position of the pointer and thereby the flow condition.

The invention in a preferred commercial construction includes a mounting plate with correspondingly mounted transmitter housing and photoresistor housing. The transmitter housing is a cast housing secured to one side of the plate, and the receiver housing, formed from the same casting by appropriate machining, is mounted to the opposite side of the plate. The plate includes a clamping means adapted to move into clamping engagement with the guard. The LED lamp and photoresistor housings include similar integral clamping tongues. In the assembled relation, the tongues are located in the slots of the opposite sides of the guard unit, and in cooperation with a clamping screw positively clamps the monitor unit in an adjusted position on the tube. The LED lamp and the photoresistor are similarly mounted within barrel units to the corresponding housing. The barrel unit may include a nut member threaded to the lamp housing to support the element with the barrels in precise alignment. The barrel projects outwardly into the mounting slot of the guard tube into essentially abutting engagement with the transparent tube.

A plurality of the monitor units may of course be secured to the flowmeter to produce signals at high and low limit positions as well as intermediate limit positions.

The present invention thus provides a reliable and inexpensive monitor for detecting flow, pressure and the like by monitoring the position of a float member in a transparent support.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is an elevational view of a gas flowmeter with a monitor alarm unit coupled thereto;

FIG. 2 is a horizontal section taken generally on line 2—2 of FIG. 1;

FIG. 3 is an enlarged fragmentary back view of the alarm unit as shown in FIGS. 1 and 2;

FIG. 4 is a vertical section taken generally on lines 4—4 of FIG. 3;

FIG. 5 is a horizontal section taken generally on line 5—5 of FIG. 1;

FIG. 6 is a fragmentary section taken on line 6—6 of FIG. 1;

FIG. 7 is an elevational exploded back view of the alarm unit; and

DESCRIPTION OF THE ILLUSTRATED EMBODIMENT

Figure 8:
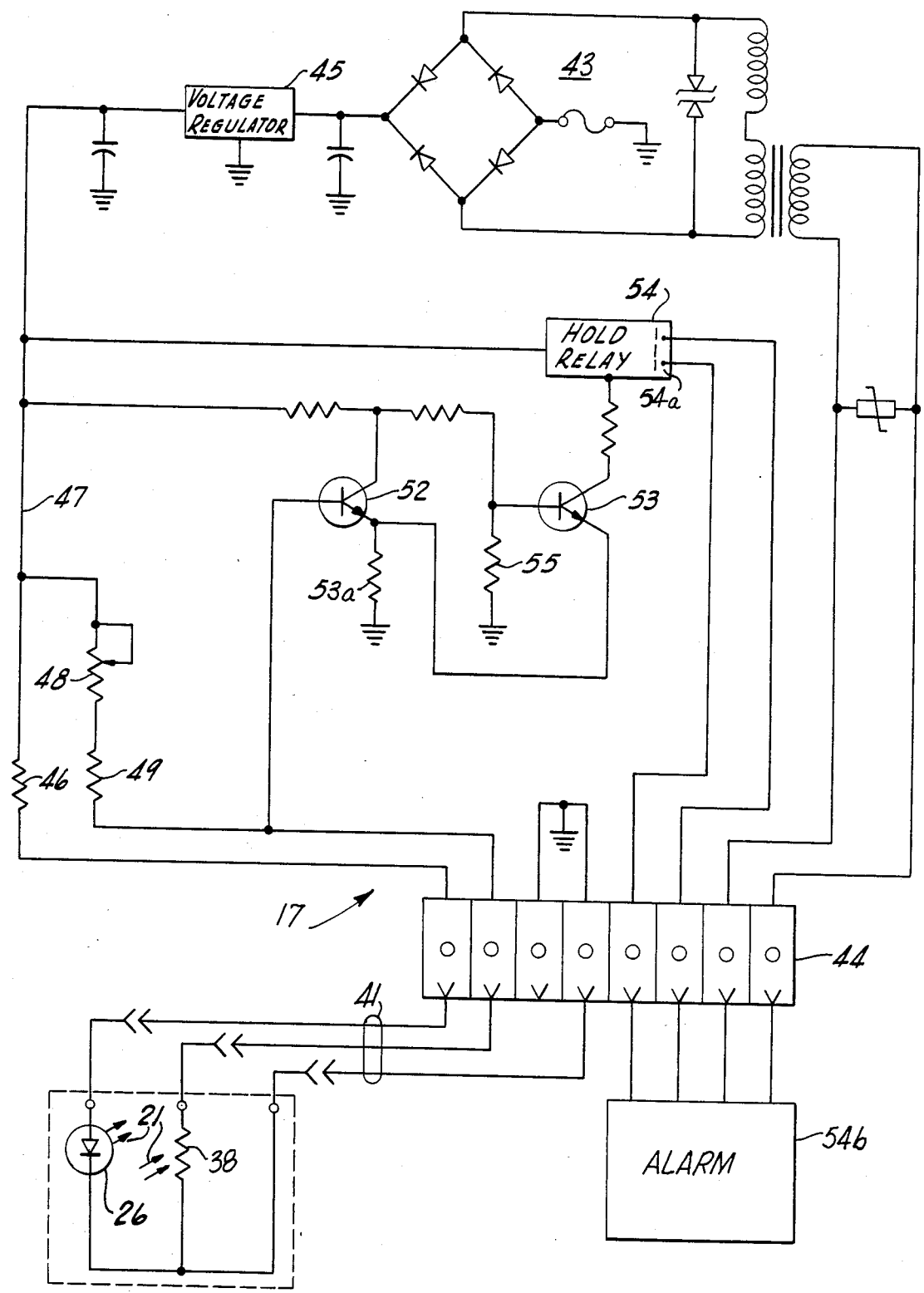
FIG. 8 is a schematic circuit of a preferred signal processing and switching circuit using the photoelectric unit shown in FIGS. 1-7, inclusive.

Referring to the drawings and particularly to FIG. 1, a gas flowmeter 8, such as shown as in prior U.S. Pat. No. 3,150,360, is shown having a monitor or alarm unit 9, constructed in accordance with the present invention, coupled thereto. The flowmeter 8 comprises a casing 10 having a tapered chamber 11 connected in a gas flow line such that the gas flow tends to lift a float 12, which is shown as a generally disc-shaped member. The float 12 has an elongated float rod or stem 13 extending into a transparent oil-filled tube 14 which is substantially enclosed in a tubular guard-scale 15. The stem 13 bears a pointer 16 for indicating the position of the float 12 relative to a readout scale 16a on the guard-scale 15. The float 12, stem 13 and pointer 16 are the equivalent of any generic "pointer" and the tube 14 is the equivalent of any transparent portion co-acting with a pointer and a scale. Obviously, the transparent portion of the flowmeter need not be tubular and the pointer need not be of the construction herein disclosed but may, for example, be of the type swinging on a pivot and such constructions are equally useful with the present device. The monitor or alarm device 9 is photoelectrically coupled to monitor the position of pointer 16 and includes an electronic control unit 17 which may include a suitable alarm indicator and readout. The present invention is particularly directed to improvement in the alarm device 9, and the other components are not described in further detail other than as required to fully describe the present invention.

The alarm device 9 is releasably attached to guard-scale 15 which is shown as a tubular member of a suitable rigid protective material such as metal or plastic. The device 9 includes a mounting unit having a flat rectangular face plate 18 which spans the transparent tube 14 and guard 15. An LED transmitter 19 is secured to one end of the plate 18 while the light beam receiver 20 is secured to the opposite end of plate 18. The transmitter 19 and receiver 20 are located to the opposite sides of the guard 15. The transmitter 19 established a light beam 21 which is transmitted through tube 14 to receiver 20. The output of receiver 20 is light sensitive and correspondingly signals the control unit 17. The output is thus sensitive to the breaking of the beam 21.

The transmitter unit 19 and the receiver unit 20 are each similarly housed and mounted to the face plate 18 as follows.

Referring to the transmitter 19, a metal housing 22, shown as a rectangular member includes an open side 23 abutting the face plate 18 and secured in place as by attachment screws 24. The housing includes a threaded opening 25 on the inner side wall aligned with the guard 15. An LED element 26 is located in a barrel mounting member 27 which threads through the opening 25, to secure the transmitter 19 to the housing wall. The LED element 26 is secured within the inner end of the barrel member 27 as by a suitable adhesive 28. Suitable leads 29 within housing 22 provide for connection to an appropriate power supply as hereinafter described. A barrel 31 extends outwardly from the barrel member 27 in precise alignment with the LED element 26. The LED element includes an integral lens 32 which produces a bright, sharp beam 21. The barrel 31 transmits the beam 21 into the float tube 14 to maintain a high intensity beam moving through the tube 14.

The housing 22 further includes a locating and clamping tongue 33, in the form of an integral plate-like projection, extending outwardly from the inner housing wall in alignment with the barrel 31 and generally for a corresponding length. The tongue 33 and barrel 31 project into a guard slot 34 in guard 15 to accurately locate the light beam 21 with the transparent tube 14 in the assembled position of the monitor unit 9 on the guard 15.

The photoresistor receiver 20 is similarly constructed and includes a corresponding housing 35 which can be milled from an identical casting for housing 22, with a threaded mounting opening 36 and an integral locating tongue 37. A photoresistor 38 is secured in a threaded barrel member 39 to precisely locate a beam receiving barrel 40 in alignment with the beam transmitting barrel 31. Photoresistor 38 is of course light sensitive and has a significantly lower electrical resistance in the presence of beam 21. The photoresistor is connected to the circuit within housing 35.

The unit 9 is clamped in position by a thumb-screw plate 18 which positions a thumb-screw positioned clamping plate 40a against guard 15 and conjointly with tongues 33 and 37 clamps the unit 9 to the guard 15. The face plate 18 includes integral locating and protecting arms 40b, which are generally C-shaped and curve from the upper edge of the face plate 18 in a curvature over the adjacent mounting nuts and barrels of the transmitter 19 and receiver 20 immediately adjacent to the guard 15. The arms 40b also serve to shield the system from stray light.

The LED lamp 26 creates a sharp beam 21 which is close coupled to the tube 14 to inject a sharp penetration light beam 21 through the liquid and thereby provide a sensitive detection of the pointers 16. The light beam 21 is of course correspondingly collected by the receiver 20. The LED light beam 21 is not as susceptible to distruption by contaminants in the oil and produces accurate detection under oil conditions which would not operate satisfactory with the conventional incandescent lamp.

The LED lamp unit 26 and the photoresistor 38 have the appropriate leads which are connected to leads from the cable 41 connected to the control or alarm unit 17. Thus, leads 42 for lamp unit 26 are shown connected within housing 22 by the usual wire nuts. Leads 42a extend laterally through an opening in the inner wall of housing 22 and across the unit behind face plate 18 into housing 35. Leads 42a with the leads from photoresistor 38 are connected to cable 41.

The output of the photoresistor 38 is connected to form a voltage dividing network to actuate a solid state switching circuit in response to change in the status of the light beam transmission by the pointer 16 as follows. Although various control switching circuits may be used, the inventors have discovered that a solid state regenerative switch circuit produces a particularly reliable response to the output of a photoresistor unit and therefor of the location of the pointer.

A preferred embodiment of a solid state switching circuit is shown in FIG. 8. A transformer/rectifier unit 43 is shown having an A.C. input connected to a conventional A.C. distribution system, not shown, via a connector 44 and operable to produce the desired D.C. output voltage, such as a 12 volt output. A voltage regulator 45 is connected to the output of the transformer/rectifier unit 43 to produce a constant 12 volt supply for operation of the switching circuit components, including the LED element 26 and the photoresistor 38.

The I/O connections are made via a conventional connector as schematically shown in FIG. 8.

In particular, a fixed resistor 46 is connected in series with the LED element 26 to the positive lead 47 of the regulated power supply 45 and establishes a fixed energization of the LED element. This creates a corresponding light beam 21.

A potentiometer 48 is connected in series with a fixed current limit resistor 49 between the positive lead 47 and the photoresistor 38. This establishes a voltage dividing network, with the connection defining a sensing node 50. The voltage at the sensing node 50 is proportional to the resistance of the photoresistor 38. The sensing node 50 is connected to actuate a regenerative monitor switch circuit 51 in response to a selected voltage at the sensing node.

The monitor switch circuit 51 is shown as a solid state "Schmitt" circuit including an input transistor 52 and an output transistor 53 connected in a known regenerative circuit. The input transistor 52 is an NPN transistor connected in a common emitter configuration. The base of the transistor 52 is connected to the sensing node 50 of the photoresistor-controlled voltage dividing network. The emitters of the transistors 52 and 53 are connected in common to ground through a common emitter resistor 53a. The base of the output transistor 53 is connected to the power supply by a voltage dividing branch 55 to bias the output transistor 53 on. The resistance of the photoresistor 38 is low in the presence of the light beam 21 and high in the absence thereof. The resistance change is substantial as the pointer 16 moves into the beam 21. The LED lamp 26 with the integrated focusing lens 32 creates a highly concentrated and well defined beam 21 of substantial intensity, which with the transmitting and receiving barrels 31 and 40, produces a very sensitive position sensing means for detecting the position of the pointer 16. Thus, even though the pointer 16 may move rather slowly through the sensitive zone, the response of the system is, for all practical considerations, a step function in which the resistance is such as to establish a low voltage or a high voltage at the sensing node 50. With the beam 21 engaging photoresistor 38, the resistance is low and the sensing node 50 and therefore the base is at a low voltage which hold the input transistor off. When the beam is broken, the resistance of photoresistor 38 increases as a substantial step function.

When the light beam 21 is interrupted by interengagement of the pointer 16, the resistance of the photoresistor 38 increases significantly, and the voltage at the sensing node 50 correspondingly increases. The input transistor 52 starts to turn on at a selected voltage. In a known manner, this drops the voltage of the collector, which in turn reduces the input voltage to the output transistor 53, which begins to turn off. This in turn reduces the voltage on the emitter of the input transistor 52 which thus is driven further on, forming a regenerative cycle which rapidly drives transistor 52 fully on and transistor 53 fully off. In summary, establishing the trigger volage at the input transistor 52 results in a rapid and self-generating switching, and actuation of the monitor output circuit, as follows.

The turn-off of transistor 53 releases a holding relay 54 which closes its contacts 54a and actuates the alarm 54B.

The transistor 53 is thus normally conducting and operates to hold the holding relay 54 energized. When energized, the relay contacts are held open and the alarm 54b is turned off. This provides a fail-safe operation, in that if the circuit should malfunction and the holding relay drops out for any reason other than a fault, the alarm is actuated such that the person in charge is warned of such fault.

To set the device for operation, the alarm or monitor device 9 is located on the guard 15 and clamped to the guard at the desired gas alarm flow rate by use of the thumbscrew on the face plate 18. If the unit 9 is wired for a low flow alarm and no gas is flowing, the alarm unit 17 will now be energized through the normally closed contacts 54a in the load control relay 54. When the specified fluid flows through the meter, the float rod 13 and indicator 16 no longer interrupts the light beam 21 and the alarm should now stop. If the alarm does not stop, the operator slowly rotates the potentiometer 48 until the alarm does not stop. If the alarm now functions as described above, system is operating properly.

If the unit is wired for a high flow alarm and no gas is flowing, the alarm circuit will be deenergized through the normally open contacts in the load control relay 54. When the specified fluid flows through the meter, the float rod 13 and particularly indicator 16 no longer interrupts the light beam 21. The alarm 54b should now start by closing the normally open contacts 54a in the load control relay 54. If the alarm does not start, the operator slowly rotates the potentiometer 48 until the alarm does start. If the alarm now functions as described above, the system is operating properly.

The system operation can of course be verified at any time to make certain it is functioning properly. This can be done by moving the alarm device 9 on the guard 15 so the light beam 21 is interrrupted if wired for a low flow alarm, or the light beam is uninterrupted if wired for a high flow alarm, either of which should actuate the alarm circuit.

The LED lamp 26 in combination with the coupling barrels 31–40 produces a sharp high intensity beam 21 which penetrates the oil even though some contamination may exist. Such a photoelectric level system thus provides a reliable and effective protective and monitoring system for various flow and pressure related processes. The sensitivity and reliability of response is particularly improved however even with the level photoelectric system by the use of the regenerative type switch to produce a positive on or off state.

Thus, the inventors have discovered that flow maonitors may respond eratically in the presence of very slow changing condition, and particularly if the clarity of the sensing oil has been degraded for any reason. In such instances, the output may cycle back and forth creating an unreliable and annoying signal to the control or alarm means. More particularly, the inventors have found that with the present prior art photoelectric systems, slow pressure or flow changes do not create a sharp effective interruption in the beam such that the sensing circuit cannot switch properly to give a true discrimination between an alarm or control state and a steady operative state. The effectiveness or sharpness in the change and response is further adversely effected by the clarity of the oil or other fluid in the sensing column, apparently because of further dispersion of the change in the light interruption. Although the latter factor may of course be minimized by more frequent monitoring of the sensing liquid, with appropriate liquid changes at relatively low levels of contamination, such a solution is relatively costly and time consuming. Even where the flow monitor is used in a relatively critical application in which reliability is the most significant factor and the cost factor is not critical, cost is a factor because of work loads being improperly produced in the process and subsequently having to be scrapped, and down time may be a significant factor. Further, the flow monitor may also be used in many applications wherein cost is a significant factor. The present photoelectric system produces a much improved signal change even in the presence of contamination. However, optimum system response is provided where the rapid acting switching unit is used to produce the distinct "on" or "off" state of the control unit 17.

The present invention therefore fills a distinct need for a level sensing apparatus which has a high degree of reliability without requiring an unacceptable cost factor. Although particularly shown applied to a gas flow meter monitor, the unit is also used as a liquid flow meter monitor and may also be used for other level detection, such as pressure sensing and the like.

Various modes of carrying out the invention are contemplated as being within the scope of the following claims, particularly pointing out and distinctly claiming the subject matter which is regarded as the invention.

We claim:

1. A monitoring device for signalling change in the position of a pointer immersed in an elongated transparent member filled with a light transmitting liquid, comprising a tubular guard for housing said transparent member and having first and second aligned elongated openings to the opposite sides of the guard, a light unit including a light transmitting barrel unit located to one side of said guard and extending into said first elongated opening, a photosensitive receiver unit located to the opposite side of said guard from said light unit, said photosensitive unit including a photoelectric transducer and including a receiving barrel unit extending into said second opening and aligned with said light transmitting barrel unit, each of said barrel units being similarly constructed with a housing and a recessed support section secured to the housing and a light carrying barrel extending outwardly from said support section into said first and second openings and terminating in close spaced relation to said transparent member, a light secured in the support section of the light transmitting barrel unit and the photoelectric transducer being secured in the support section of the receiving barrel unit, a common support for said housings of said light transmitting barrel unit and said receiving barrel unit, and releasable attachment means connecting said housings to said common support for movement along said transparent member.

2. The monitoring device of claim 1 wherein said light is a light emitting diode having an integral focusing lens to define said beam of light.

3. The monitoring face device of claim 1 wherein said common support includes a mounting plate spanning the transparent member, said housings of said light unit and said receiver unit being mounted to spaced portions of said face plate and each of said housings including an integral locating and clamping tongue member aligned with the corresponding barrel, and said releasably attachment means includes a movable clamp member operable with said tongue members to clamp the plate to said guard.

4. The monitoring device of claim 1 including a voltage sensitive solid state regenerative switch unit connected to said photoelectric transducer and having regenerative drive means to drive the switch unit wholly on and off in response to an initial starting of said switching, and an output means connected to said regenerative switch unit.

5. A monitoring device for signalling change in the position of a pointer immersed in a transparent tube member filled with a light transmitting liquid, the monitoring device comprising a guard member mounted about the transparent member and having first and second locating openings to the opposite sides of said tube member and extending parallel to the tube member, an LED unit located to one side of the guard member in alignment with the first opening, said LED unit including a housing and an LED lamp having an integrated focusing element to establish a sharp well defined beam of light, a transmitting barrel connected to said housing and projecting into said first opening and aligned with said element to transmit said beam of light, said transmitting barrel terminating in close spaced relation to said transparent tube member, a photosensitive receiver unit located to the opposite side of said guard member from said LED unit, said photosensitive receiver unit including a receiver housing and a photoelectric transducer in said receiver housing, a receiving barrel secured to said housing and projecting from said receiver housing into said second opening into close spaced relation to said transparent tube member, means mounting said transducer within said receiver housing in alignment with said receiving barrel and said receiving barrel transmitting said beam of light to said photoelectric transducer, a common support connected to said housings and to said guard member, and a switch means connected to said transducer and actuated thereby.

6. The monitoring device of claim 5 wherein said common support is a mounting bracket having a faceplate spanning the transparent tube member, each of said housings of said LED unit and of said photosensitive receiving unit being a separate rectangular housing open on one side and correspondingly mounted to said faceplate to the first and second sides of said transparent tube member in alignment with said first and second openings, said transmitting barrel having a mounting hub portion releasably secured to the housing of said LED unit and having said transmitting barrel extending from the hub portion aligned with the focusing element, said receiver unit having a photoresistor element and mounting means mounting the photoresistor element in an opening in said receiver housing, said barrel of said receiver unit having a mounting hub portion releasably secured to the receiver housing and having said barrel extending from the hub portion aligned with the photoresistor element, and each of said housings including a tongue member extending outwardly and aligned with the corresponding barrel and projecting into corresponding locating opening of the guard member.

7. A monitor device for detecting change from a given value of a fluid flow indicated by movement of a mechanical pointer means immersed in a transparent tube of a flowmeter, the monitor device comprising a guard secured about the transparent tube and said guard including first and second aligned locating slots located one each to the opposite sides of the transparent tube, a monitor support plate, a focused LED transmitter having a housing releasably secured to the plate to the one side of the transparent tube and having a light transmitting barrel connected to said housing and projecting into one of said locating slots and terminating in close spaced relation to said tube, an LED lamp in said housing aligned with said barrel, a photoresistor receiver having a housing releasable secured to the plate to the opposite side of the transparent tube and having a photoresistor in said housing and having a receiving barrel extending from the housing into the second of said slots and aligned with said light transmitting barrel to transmit the light beam to the photoresistor, said transmitter and said receiver each having a locating tab aligned with said barrels and projecting into said slots, and a clamp means secured to said plate and abutting the guard to conjointly with said tabs, clamp said plate to said guard, a regulated solid state power supply having a first connection to said LED lamp and a second connection to said photoresistor, said second connection including a variable resistance means to define a sensing node between said variable resistance means and said photoresistor, and a triggered regenerative solid state switch having an input connected to said sensing node.

* * * * *

UNITED STATES PATENT AND TRADEMARK OFFICE
CERTIFICATE OF CORRECTION

PATENT NO. : 4,550,314
DATED      : October 29, 1985
INVENTOR(S) : WALLACE I. STENZEL ET AL It is certified that error appears in the above-identified patent and that said Letters Patent is hereby corrected as shown below:

Col. 1, line 18, delete "Similary" and substitute therefor ---Similarly---; Col. 2, line 18, delete "alinged" and substitute therefor ---aligned---; Col. 4, line 10, delete "established" and substitute therefor ---establishes---; Col. 5, line 16, after "Leads" delete "42a" and insert ---42--- and before "from" insert ---42a---; Col. 6, line 28, delete "volage" and substitute therefor ---voltage---; Col. 6, line 33, delete "54-B" and substitute therefor ---54-b---; Col. 6, line 47, delete "17" and substitute therefor ---54b---; Col. 6, line 53, after "does" delete "not"; Col. 7, lines 15-16, delete "maonitors" and substitute therefor ---monitors---; Col. 8, line 23, after "monitoring" delete "face"; Col. 8, line 24, after "mounting" insert ---face---.

Signed and Sealed this

Twenty-ninth Day of July 1986

[SEAL]

Attest:

DONALD J. QUIGG

Attesting Officer    Commissioner of Patents and Trademarks